Oct. 5, 1954          N. MILLER            2,691,084
                     CONTROL DEVICE
Filed April 29, 1952                    5 Sheets-Sheet 1
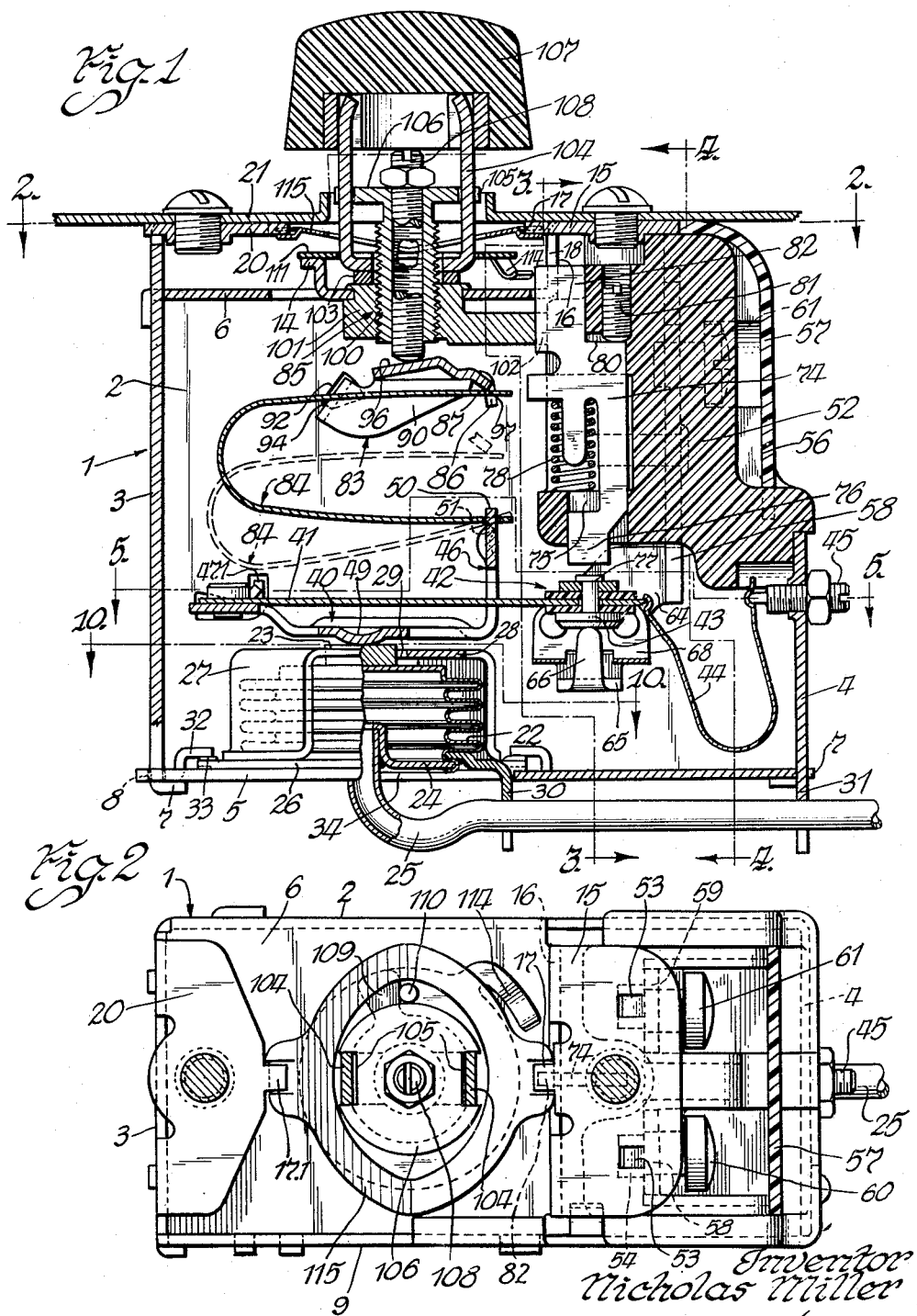

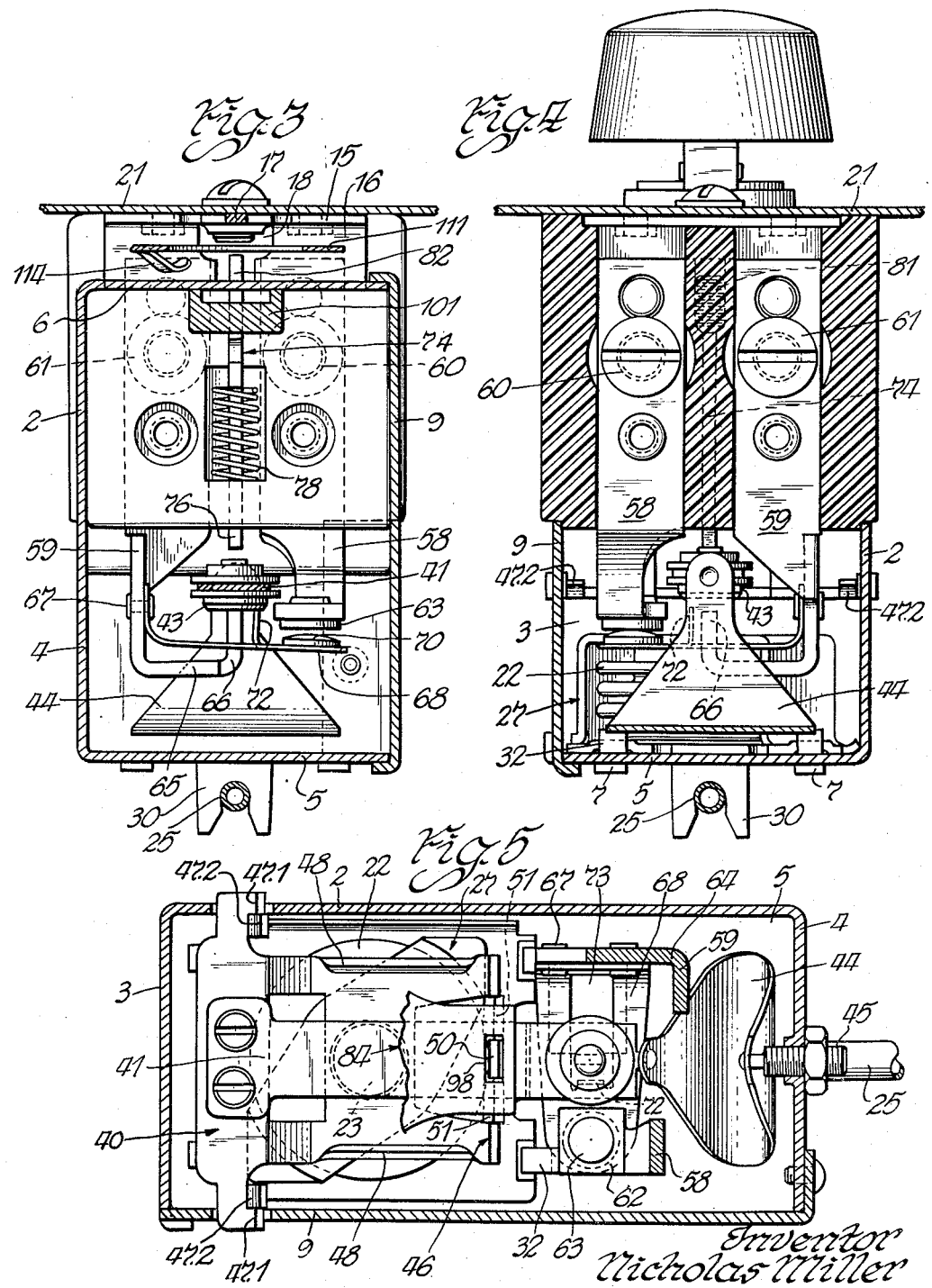

Oct. 5, 1954
N. MILLER
2,691,084
CONTROL DEVICE
Filed April 29, 1952
5 Sheets-Sheet 3
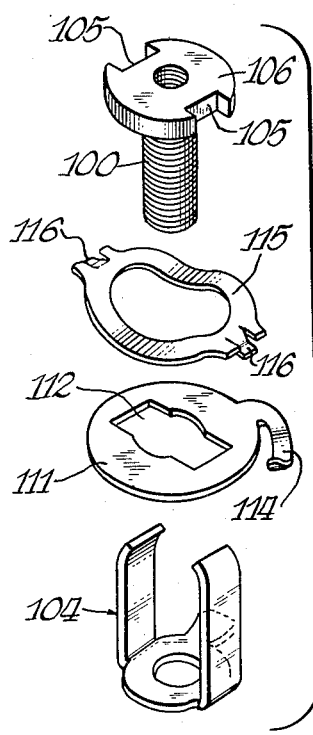
Fig.6
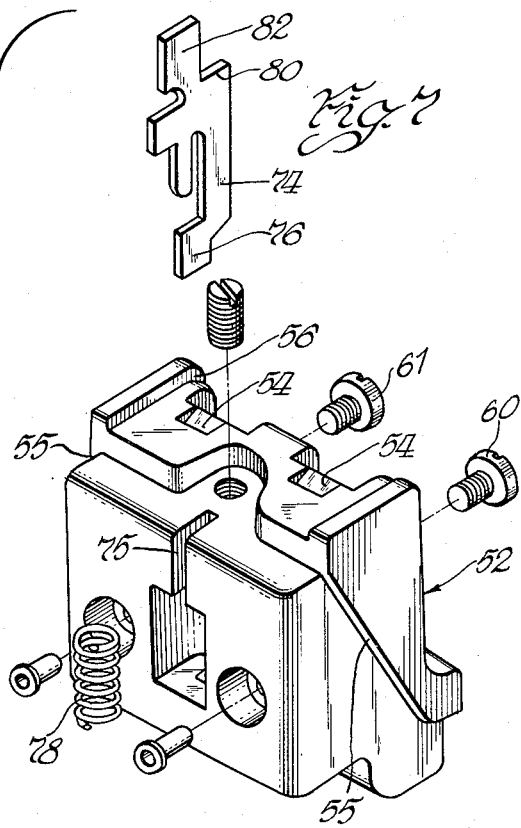
Fig.7
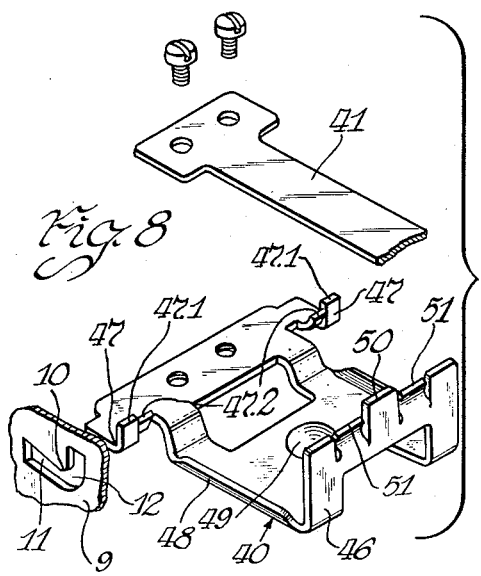
Fig.8
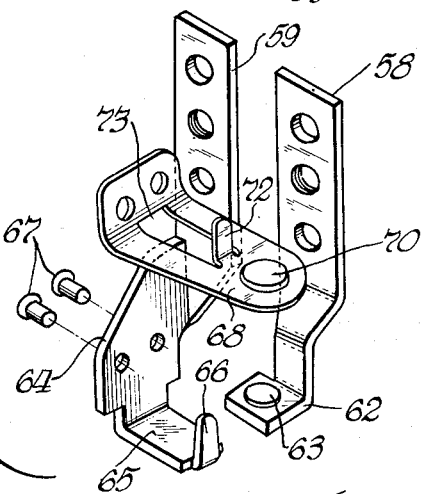
Inventor
Nicholas Miller
by Andrew T. Hubbard
Atty.

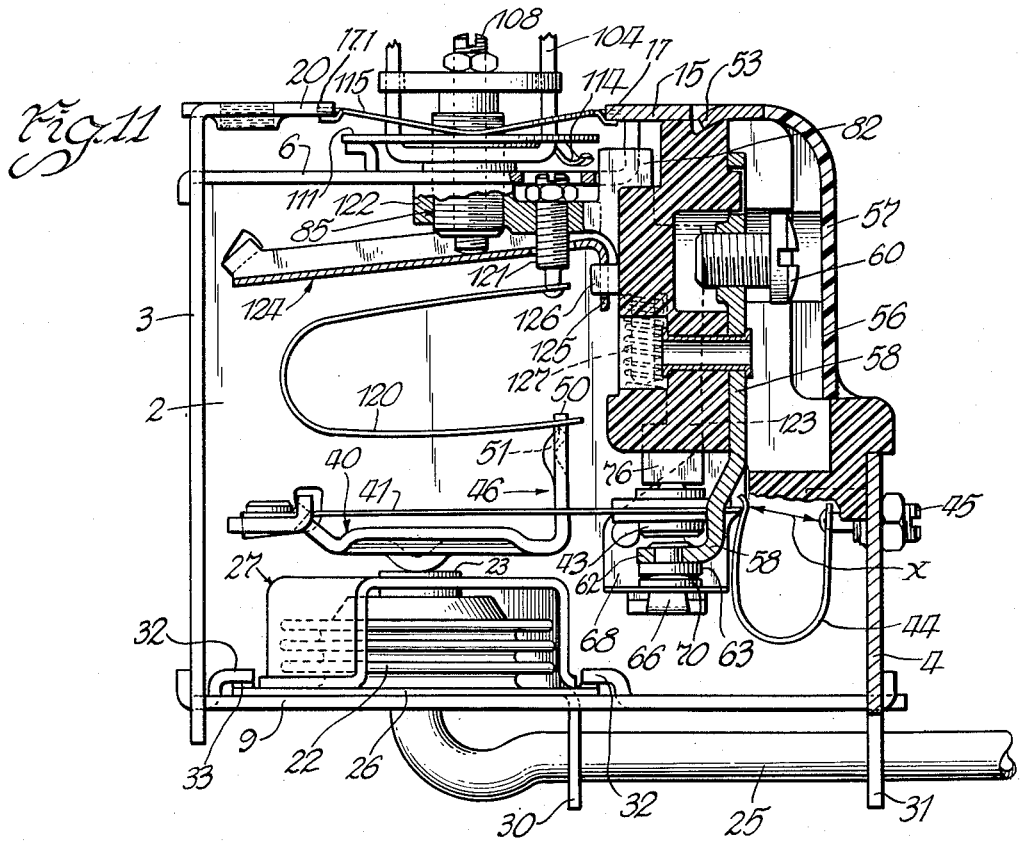

Oct. 5, 1954
N. MILLER
2,691,084
CONTROL DEVICE
Filed April 29, 1952
5 Sheets—Sheet 5
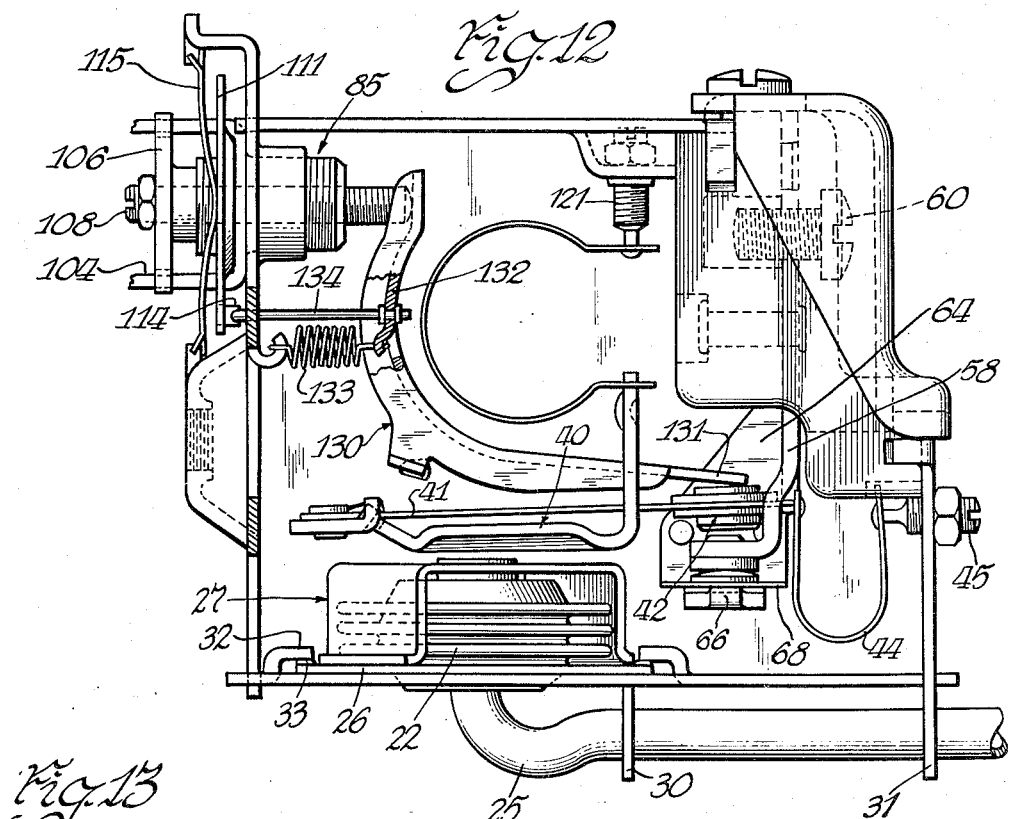
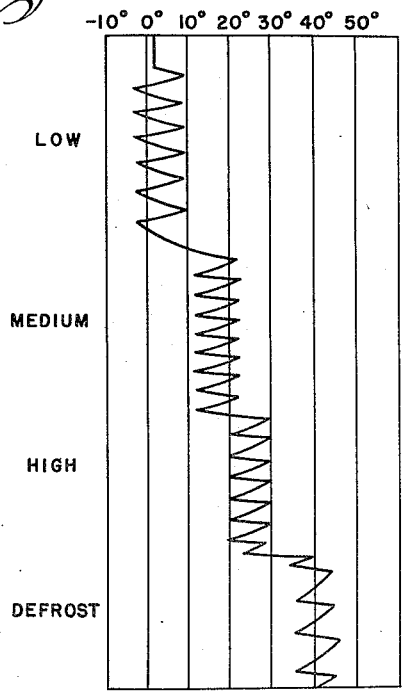
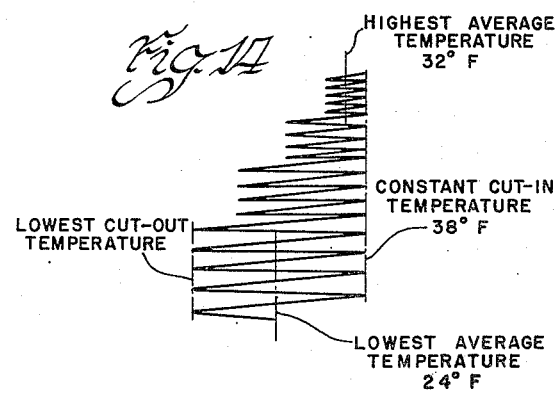

Patented Oct. 5, 1954

2,691,084

UNITED STATES PATENT OFFICE 2,691,084

CONTROL DEVICE

Nicholas Miller, Berwyn, Ill., assignor to General Electric Company, a corporation of New York Application April 29, 1952, Serial No. 284,851

12 Claims. (Cl. 200—140)

This invention relates to improvements in control devices such as thermostats or pressurestats.

Among the objects of the invention are: To provide a control device having an improved control-point adjustment system; to provide means for maintaining a uniform cut-in point and a selectively variable cut-out point with variable amplitude; to provide an improved subassembly of the tube and bellows of the thermosensitive system of a thermostat; to provide an improved overthrow spring system for operation of the control device between open and closed-circuit positions in response to physical change of the apparatus being controlled; to provide an improved switch-contact assembly and operator therefor; to provide an improved arrangement for adapting the control device as an "on-off" switch; and to provide an improved casing in which fulcrum points and other dimensional interrelationships may be accurately established.

In the accompanying drawing, Fig. 1 is a side sectional elevation of one form of control device embodying the invention, said device being arranged for substantially constant amplitude response at various control levels as shown in Fig. 13; Fig. 2 is a plan section of Fig. 1 taken on lines 2—2 thereof; Fig. 3 is a sectional elevation taken on lines 3—3 of Fig. 1, showing the switch contacts in open-circuit relationship; Fig. 4 is a sectional elevation taken through the terminal block on lines 4—4 of Fig. 1, showing the contacts in closed-circuit position; Fig. 5 is a plan section taken through 5—5 of Fig. 1; Fig. 6 is an exploded perspective of the control-point adjustment assembly; Fig. 7 is an exploded perspective of the terminal block and contact element; Fig. 8 is an exploded, partially fragmentary, perspective of the contact-actuating lever assembly; Fig. 9 is an exploded perspective of one form of pressure lever for establishing the operating bias of the contact lever control spring; Fig. 10 is a plan section on lines 10—10 of Fig. 1 showing details of the expansion chamber assembly and mounting means; Fig. 11 is a side sectional elevation of a control assembly productive of constant cut-in and variable amplitude response as shown in Fig. 14; Fig. 12 is a second embodiment of a control device of the type of Fig. 11; and Figs. 13 and 14 are respectively temperature-responsive curves for the constant amplitude and variable amplitude control embodiments.

A control device embodying features accomplishing the recited objectives comprises a casing, a thermal or pressure-actuated motor system, a contact or other system for controlling external apparatus as dictated by the operation of the motor system, and a mechanism or arrangement for effecting operation of the contact system within selected ranges of operation of the motor system. The invention will be described with reference to a thermostat, and in particular to a thermostat exercising control over the compressor of a refrigerator system.

The casing

To facilitate the assembly of the components of the several mechanisms of the thermostat while providing substantial accuracy of alignment of pivot points and the like, I form a five-sided casing portion 1 from a single blank of quarter-hard stainless steel strip of suitable thickness, and simultaneously with the blanking out of the strip to provide the necessary wall contours, provide in certain walls apertures which later become pivot points for the lever systems. Specifically, the blank provides the side wall 2, end walls 3 and 4, bottom wall 5, and the top wall 6. During the blanking operation, certain of the walls are formed with tongues 7 and apertures (see aperture 8, Fig. 1, shown with exaggerated clearance) which cooperate to maintain the relationship of the wall-forming portions of the blank when they are appropriately folded into an open-sided box form. A typical pivot aperture is shown in Fig. 8; said aperture, formed in the opposite side wall 9, has a rounded tongue 10 at the juncture of angularly related slots 11 and 12, which receive the bearing end of a lever as later described.

Top wall 6 has a lanced-up finger 14 and an upwardly and angularly offset wall 15, from the vertical portion 16 of which is struck a horizontally extending lug 17. Said vertical portion 16 therefore has a slot 18 within which operates an end of a slide member as later described. Wall 15 is co-planar with a wall 20 projecting upwardly and inwardly from end wall 3. The respective walls 15 and 20 provide surfaces to which may be attached an escutcheon or mounting plate 21.

In forming the basic five-sided casing structure 1, the top wall 6 and end wall 3 may be operated on while still in the flat to displace the respective offset walls 15 and 20, and then the top wall portion may be bent forwardly at right angles to the side wall 2. The end walls 3 and 4 are then brought into right angular relationship to side wall 2, during which operation the several tongues projecting from said side wall project through the apertures 8 previously formed in the end walls. Then the bottom wall 5 may be folded into place and as it reaches its home position, the one or more tongues 7 of the end walls penetrate the slots 8 provided in the bottom wall to receive them. The tongues may then be bent over into final position. The opposite side-wall 9 is applied following the installation of the several mechanisms, and it will be apparent that by die-cutting the blanks for accurate relationship of pivot apertures and the location of the tongues and tongue-receiving openings, the alignment of the cooperating pivot points of the side walls may be maintained within very close limits.

The motor system

The motor system includes an expansible and contractable chamber 22—for example, a metal bellows or closed chamber having a flexible end wall. The end wall of the bellows, or the flexible wall of a closed chamber, is provided with a rigid head 23, and the opposite end wall 24 advantageously provides a rigid closure member having a central neck portion to which is secured the end of a tube 25 in pressure-tight relation therewith. Said tube communicates with a source of pressure externally of the casing; the fluctuations of such pressure result in the expansion or contraction of the bellows. In a temperature-responsive control device—for example, a thermostat to control the operation of the compressor of a refrigeration system—the tube 25 would be of "capillary" size, closed at one end and containing a charge of liquid having a predictable vapor pressure at various temperatures. For example, the liquid may be that known in the refrigeration art as Freon 12; such a liquid has the property that in a closed system, its vapor pressure per square inch has a definite value which is constant at any given temperature of the liquid and is independent of the volume of the system so long as any unevaporated liquid remains in the system.

As best shown in Figs. 1 and 10, the bellows 22 is secured to a rigid mounting plate 26, and to said mounting plate is secured a saddle 27, which extends about the bellows. The rigid cross member 28 of the saddle has an opening 29 for free passage of the head 23. The cross member is spaced sufficiently above the upper end of the bellows to permit unrestrained operation thereof within the usual operating range of the thermostat; but if the thermostatic system were subjected to higher temperatures, such as the normal room temperature of the manufacturing or service shop, the bellows will expand only as permitted by the rigid cross member 28, thus preventing the bellows from being overextended or strained.

I hold the tube 25 against displacement relative to the bellows by passing it between the legs of a bracket 30 depending from the plate 26, and then crimping said legs tightly about the tube (see Fig. 3). A similar bracket 31 may be formed as part of the casing wall 4.

The complete bellows and tube assembly is placed within the casing before any of the other mechanisms are installed. This may readily be done because of the protection given to the bellows by the saddle 27. I form the bottom wall 5 of the casing with lanced-up tongues 32 and strike up bosses 33 from the baseplate 26. The bottom casing wall is provided with a large opening 34 (shown in outline in Fig. 10) through which the capillary tube—secured by the leg portions of bracket 30—is threaded from above. The area of the opening 34 permits the bellows assembly to be manipulated in such fashion that the bosses 33 may be brought into position beneath the tongues 32. For accurate final positioning of the bellows, the plate 26 is formed with a notch 35 for cooperation with a lug or emboss 36 struck upwardly from a casing plate 5. The resilient engagement of the tongues 32 with bosses 33 will adequately secure the bellows assembly within the casing.

The contact mechanism

The contact mechanism is uniform in the three embodiments shown in Figs. 1, 11, and 12. Referring first to Figs. 1 and 8, the contact system includes a rigid lever 40, to one end of which is riveted, or otherwise secured, a flexible contact-actuating blade 41 carrying at its end a striker assembly 42, which may include a large-headed rivet 43 insulated from the blade, as clearly appears. The free end of the blade 41 has a knife edge for cooperation with the usual overcenter spring 44. This spring, which is of U-formation, is arranged to be adjustably tensioned by the pivot screw 45 to provide control of the amplitude of response as is well known in the art. It will be noted that blade 41 passes through an opening in a vertical leg portion 46 of lever 40, and that said blade is secured to the lever substantially in the plane of the bearing surfaces 47, said surfaces being provided by the 90-degree tongues 47.1 struck upwardly from lever 40 to provide smooth and uniform curves which define the bearing area. Said bearing surfaces cooperate with the rounded tongues 10 (Fig. 8) in the casing side plates; and to maintain the stability of lever 40 within the casing, the lever is formed with the lugs 47.2 immediately inside the tongues 47.1 as best appears in Fig. 5. It will be noted that spring 44 exerts a leftward thrust (as viewed in Fig. 1) on contact blade 41, thereby maintaining the bearing surfaces 47 resiliently in contact with the bearing tongues 10.

Lever 40 is made rigid intermediate its ends by forming flanges 48 along the sides thereof; and the lever is arranged for cooperation with the head 23 of the bellows 22 by providing a spherical dimple 49 to provide a point contact with said head. A vertical lug 50 of lever arm member 46 is flanked by mutually aligned pivot edges 51, the plane of which is in the transverse central plane of arm 46.

The contact structure which I prefer to use will best be understood from a comparison of Figs. 7, 3, and 4. A terminal block 52 of insulation material, such as a phenol-condensation product, is shaped to fit in an upper cover portion of the casing 1, being suitably retained therein by screws (not shown) passing into the terminal block through the rear casing wall 4 and by tongues 53 (Fig. 2) struck downwardly from the top casing portion 15 into depressions 54 in the block. It will be noted that said terminal block has side shoulder portions 55 which abut against correspondingly sloped edges (not shown) of the casing side walls, and marginal walls 56 at the top and rear of the terminal block to receive an insulating cover piece 57 (Fig. 1). Within suitable slots in the rear of the terminal block are secured heavy metal terminal strips 58 and 59 having the respective terminal screws 60 and 61. Terminal 58 has a flange 62 extending inwardly of, and in suitable spaced relation to, the bottom of the block 52, and to said flange is affixed a contact 63 of silver or equivalent contact metal. Terminal 59 has an angularly offset contact-mounting portion 64 which presents a flat surface as best shown in Fig. 7; and at the bottom of said portion 64, the terminal has an inwardly projecting portion 65 terminating in an upstanding stop 66. Fixed to said portion 64, as by the illustrated rivets 67 or other appropriate means, is a spring metal contact 68 having a contact button 70. Said spring contact 68 also has an actuating finger 72 struck upwardly therefrom at the end of an opening 73 which is of sufficient area to pass the rigid stop 66, as best shown in Fig. 4. Figs. 3 and 4 show that the respective contact elements 63 and 70 are in cooperative alignment, and that the spring metal contact 68 is biased to bring said contact elements into normally closed-circuit relationship. It will also be noted that the actuating finger 72 projects upwardly beyond the stop 66 so as to be the first to be engaged by the striker 42 when the actuator blade 41 moves downwardly to displace contact spring 68 into open-circuit position as presently explained.

An upward limit of movement of contact-actuator blade 41 is established by a slide member 74 mounted in a slot 75 formed in terminal block 52. Said slide member has a foot 76 which extends beneath the block 52 in alignment with the headed shank 77 of the striker button 43, and said slide member is biased upwardly by a spring 78 to bring a shoulder 80 of slide member against a stop screw 81. In said position the head 82 of the slide member projects through the opening 18 in the top casing wall 6 and extends above said wall for a purpose later explained.

*The setting mechanism*

The setting mechanism disclosed herein is of two types—that illustrated in the Fig. 1 embodiment, which provides uniform amplitude over a selected range of operating temperatures, and the embodiments of Figs. 11 and 12 in which the mechanism, although basically the same, is arranged to provide a constant cut-in temperature and variable amplitude to establish desired average temperatures.

Referring first to Fig. 1, the setting mechanism includes means for biasing the lever 40 to resist expansion of the bellows 22 and means for adjusting the strength of said bias. Specifically, the mechanism includes an adjustable biasing spring support—in this embodiment, the lever 83—the biasing spring 84 interposed between levers 83 and 40, and an adjustment screw assembly 85. As best shown in Fig. 9, lever 83 has a body portion provided at its front end with downwardly extending guide tongues 86 on each side of a pivot portion 87. The pivot edge 88 (Fig. 9) of the lever results from the angle at which the pivot portion 87 is bent relative to the remainder of lever 83. During the stage when the lever is blanked out of its sheet metal stock, the end wall of the pivot portion is cut square with respect to the upper and lower walls of the stock, and by then bending the pivot portion at a 45-degree angle, the lowermost edge of said end wall becomes a pivot edge without the careful grinding or milling required, for example, in producing the knife edge at the free end of the contact actuator blade 41. Lever 83 is further characterized by the rigid side walls 90, from the ends of which are offset the bearing arms 91. Said arms are notched as shown, and when the arms are mounted within the apertures of the side casing walls—for example, the aperture 92 of the side wall 2—the edge 93 of each arm seats within the smoothly-rounded corner 94 of the aperture and the lever is pivotally supported thereby. The respective edges 93 are formed by the angular bending of the arms 91 relative to the sides 90, much the same as described with respect to pivot edge 88. The shoulders 95 at the base of the pivot arms 91 are engageable with the faces of the side casing walls to prevent the shifting of the lever 83 within the casing. The lever may advantageously be completed by forming a shelf 96 which provides a bearing surface for the adjustment screw.

Because the bias exerted by the spring 84 against the bellows system controls the response of the thermostat at the various temperature settings, it is important that such biasing springs maintain load-deflection ratios within close tolerances. Helical springs which have previously been used extensively in control device construction are affected in their load-deflection ratio by the material and diameter of the spring wire, the mean diameter of the spring coil, and the effective number of coils. In some controls using helical springs, means have been provided whereby the number of effective coils may be adjusted to obtain a desired load-deflection ratio, for without such adjustment it becomes necessary to fabricate the springs to close tolerances, which adds to the cost.

Instead of a helical spring, the biasing spring 84 is of the U-type. The load-deflection ratio of such a spring depends upon the spring and the thickness; the configuration of the spring; and the depth of the U measured at right angles to a line joining the points of pressure application—in this case, a line between the pivot edges 51 and 88. Since the shape of the spring is precisely reproduced in fabrication with a blanking die, and the U formation with a forming die, the only dimensional factor which requires special consideration is the thickness of the material. A further advantage of the U type of spring is that its stresses are in tension and compression, whereas in a helical spring they are in shear. In most spring materials, the allowable tensile and compressive stresses are of the order of 50% higher than the allowable shear stresses, and the U type spring therefore makes more efficient use of the spring material.

Spring 84 is arranged to have a central portion 97 in engagement with the pivot edge 88 and side wall portions (not shown) which lie along the outermost edges of the tongues 86 of lever 83. At the lever 40, spring 84 may have an opening 98 which freely receives the guide tongue 50 of said lever; the spring portions at each side of the opening 98 rest upon the bearing edges 51 as appears in Fig. 5.

The adjustment screw assembly 85 includes a tubular screw 100 operating within a threaded bushing 101 fixed to casing wall 6; said bushing extends forwardly to a forked end 102 which slidably embraces the forward portion of the member 74. Rotatably carried on a bearing washer 103 is a U-shaped actuator 104, the upwardly extending legs of which pass through notches 105 in the head 106 of screw 100. The legs of member 104 seat non-rotatably within a cavity in the adjustment knob 107. Screw 100 is of relatively coarse pitch so as to accomplish full deflection of spring 84 within a single rotation of the knob 107. For the purpose of accurate calibration, said screw is internally threaded for the reception of a fine pitch calibration screw 108, which may be manipulated by a screwdriver after removing knob 107, and then locked in adjustment by the illustrated locknut. It will be noted that the end of screw 108 bears against the shelf 96 of lever 83, and because said screw is immovably locked within screw 100, rotation of screw 100 by the knob 107 will produce rotation of lever 83 to increase or decrease the biasing effort of spring 84 according to the direction of rotation. The limits of rotation of the knob 107 are established by an ear 109 adapted to engage a pin or lug 110 in the upper casing plate 6, as indicated in Fig. 2. A cam plate 111 is fixed relative to actuator 104, as by the passage of the legs of said member through the elongated slot 112 (Fig. 6) in said plate. Said cam plate has a cam portion 114 which upon appropriate rotation of the knob 107 sweeps across the head 82 of slide member 74 to force said member downwardly for a purpose later described.

Finally, the setting mechanism may include a friction washer 115 having a large center opening which rotatably receives the member 104, and locking tongues 116 which straddle and engage lugs 17, 17.1 on the upper casing wall (Fig. 2).

*The operation of the Fig. 1 embodiment*

Assuming the thermostat to be in refrigeration service, when contacts 63 and 70 are opened, the compressor is "off" and the refrigerator is on the heating cycle. This is the condition of Figs. 1 and 3. As the refrigerator evaporator (not shown) warms, the temperature of the thermostatic liquid in the capillary 25 rises, it being understood that in the usual refrigeration application the temperature-sensitive end of the capillary is in heat exchange relation with the evaporator. The vapor pressure therefore increases and bellows 22 expands, rotating lever 40 upwardly against the bias of spring 84. The rotation of said lever tilts the contact actuator blade 41 upwardly, bowing it slightly convex relative to the lever 40. As said lever continues to rotate upwardly, the movement of blade 41 first compresses the overthrow spring 44 and then causes it to snap overcenter, whereupon blade 41 will rise, releasing finger 72 of contact 68 as it does so and permitting the contact to close. The upward movement of blade 41 is limited by the foot 76 of slide 74.

As the cooling cycle proceeds, the refrigerator evaporator chills and the vapor pressure in the bellows system decreases. Spring 84, acting against lever arm 45, will slowly compress the bellows and lever 40 will rotate downwardly of Fig. 1. Blade 41 will assume an increasingly convex form, until its action drives the overcenter spring 44 through its dead center point. Blade 41 will then snap downwardly and striker 43 will engage the finger 72 of the spring contact arm 68 causing contacts 63 and 70 to separate. The stop finger 66 limits the downward movement of the blade 41.

The response of the Fig. 1 embodiment is indicated in Fig. 13 which is a reproduction of a temperature record of an actual test run. It will be noted that the amplitude is fairly constant; said amplitude is established by establishing the desired tension of spring 44 by screw 45. The "low" setting is established by the minimum bias of spring 84; for it is apparent that a low spring bias will interpose little resistance to the expansion of the bellows 22. As the knob is rotated to drive lever 83 into clockwise rotation, spring 84 becomes increasingly stressed and correspondingly increases the load on the bellows. It is then necessary for the bellows to exert more force on lever 40 to rotate the blade 41 into open-circuit position, and, of course, this requires a higher temperature of the thermostatic liquid. The amplitude of the control cycle remains substantially constant because the tension of spring 44 is constant.

Two characteristics of the relationship between spring 84 and lever 40 will be observed in Fig. 1. First, it will be noted that a line between the pressure points of the spring—that is, a line between the respective fulcra 88 and 51—does not deviate substantially from the vertical throughout the full range of adjustment represented by the full line position of the spring corresponding to the low temperature adjustment and the broken line position typifying the highest temperature adjustment. Over the entire range, therefore, the major component of force of the spring is applied to the vertical portion 46 of the lever in its most efficient relation—substantially in alignment with said vertical portion and therefore at right angles to the lever 40 and substantially parallel to the movement of the bellows. Angular components of forces which dissipate the effectiveness of the spring are minimized. At the normal intermediate setting the swing of lever 83 downwardly of Fig. 1 would position its fulcrum 88 almost exactly in the vertical plane through the fulcrum 51 and the legs of the spring 84 will be practically normal to such plane.

Secondly, it will be observed that the spring 84, being made of thin material, undergoes a relatively large deflection over the operating range of the thermostat, as compared with the usual deflection of a helical spring in same environment. A high deflection rate improves the accuracy of response of the thermostat because it tends to minimize the inevitable structural inaccuracies inherent in mass-produced devices. The response of the thermostat at various dial settings over the range of operation is thus predictable and repetitive.

The flexible actuator blade 41 complements the overcenter spring 44 in providing optimum snap action operation. As lever 40 rotates in either direction, the relatively long blade 41 flexes as a column. At one end the spring subjects the blade to an axial load; and at the other end the blade is being mechanically deflected. During the initial movement of the lever 40, blade 41 stores the energy being expended by the bellows 22; such energy is transmitted to the overcenter spring, causing the spring to react through its dead center position to bring the contact blade to its new operating position.

The "off point" setting results from rotation of knob 107 counterclockwise of Fig. 2 to the full extent permitted by stop 119. This brings the cam 114 into engagement with the head 82 of slide 74 and cams said slide downwardly sufficient to bring its foot 76 against the end of the striker, forcing actuating blade 41 downwardly to open-circuit position. Because of the restraint thus imposed on the blade 41 and the flexibility thereof, the contacts will remain in open-circuit position even if the bellows 22 should expand to its limit. As shown in Fig. 1, the slope of cam 114 is relatively gradual and when the knob is rotated in clockwise direction to restore the thermostat to operation, there will be a gradual rather than a sudden relaxation of the restraint on the blade 41. Hence, even though the bellows 22 may be imposing maximum effort on the contact lever system at the time the thermostat is released from "off" position, there will be no violent reaction of the contact lever system.

*The variable amplitude types*

In the embodiment of Fig. 11, all parts identical with those of Fig. 1 use the same reference characters. It will be understood that the opening and closing of the contacts 63 and 70 occurs in the manner described with respect to Figs. 1, 3, and 4.

It will be noted from Fig. 14 that the thermostat operates at a constant cut-in temperature of 38 degrees F. This is accomplished by establishing an appropriate fixed loading for spring 120, thereby removing said spring from the response temperature adjustment system per se. The cut-out temperature is established by controlled adjustment of the permitted travel of the contact-actuating arm.

Specifically, spring 120 is disposed between the contact system lever 40 and a spring support such as a pressure screw 121 mounted in the bushing 122. The pressure screw may be manipulated by a screwdriver or equivalent to adjust the tension of spring 120 and may be locked in its adjustment by a locknut as shown. The spring 120 thus always imposes the same resistance to expansion of bellows 22, and the switch contacts will always close when the pressure within the thermal motor system reaches the value sufficient to overcome the spring bias.

The cut-out temperature is adjusted by adjusting the permitted throw of contact-actuating blade 41. This is done by adjusting the position of the slide member 123 relative to the striker assembly 43 of the arm 41. Specifically, I pivotally mount within the housing a channel-like adjustment arm 124 having a forked end 125 embracing an extension 126 of said slide 123; so that at a low cut-in temperature adjustment, represented by Fig. 11, the spring 127 urges the slide away from the blade 41. This increases the effectiveness of the end thrust spring 44 in that the permitted movement of the actuator arm increases its overthrow travel so that the force component X slopes relatively sharply upwardly as viewed in Fig. 11. It therefore takes a relatively high pressure on lever 40 to throw the blade 41 through the dead center of spring 44; and since said pressure is actually the pressure differential between the force exerted by spring 120 and the opposing force exerted by the bellows 22, it will be seen that—the spring force being constant—it is the force component contributed by the bellows which must be reduced. But the bellows force is directly affected by the pressure within its closed system; and the pressure is a direct function of the temperature of the thermostatic bulb. From this it is apparent that the compressor will continue to operate until the evaporator pulls the control system down to the proper pressure level.

To increase the cut-out temperature, the control knob is rotated in a direction to move lever 124 clockwise about its pivot as viewed in Fig. 11. This urges the slide 123 downwardly against the bias of the spring. Because this limits the upward movement of blade 41, it lowers the overcenter slope X. A lesser differential between the mutually opposing pressures of the spring 120 and bellows 22 is required to throw the blade 41 overcenter to the contact-open position; hence, it is not necessary for the pressure within the thermal motor system to drop to as low a value as above discussed in order to cause the compressor circuit to open.

It will, of course, be understood that the total movement of slide 123 from one to the other of its cut-out control positions is small. In an embodiment of the present invention, the downward movement of blade 41 and its striker mechanism is of the order of .012 inch below the dead center position of spring 44. The maximum upward movement above dead center to establish the coldest cut-in temperature is .032 inch, and the least upward movement—establishing the highest average temperature shown in Fig. 14—is .012 inch above dead center. The adjustment range of the slide 123 is therefore of the order of .019 inch, and it will be apparent that the adjustment screw system 85 will be of much finer pitch than its counterpart in Fig. 1. The Fig. 11 embodiment is provided with the "off" position cam 114 which cooperates with the slide 123 to hold the contacts open as previously described.

The embodiment disclosed in Fig. 12 is similar to that of Fig. 11 except for the mechanism for adjusting the contact-making stroke of the actuating blade 41. Specifically, I employ a bell crank 130 pivotally mounted in the casing side walls as shown. An arm 131 overlies the striker assembly and the opposite arm 132 is placed in operative association with the adjustment screw system 85. A spring 133 biases lever 130 into continuous engagement with the adjustment screw, and it will therefore be apparent that rotation of said screw in one or another direction will appropriately position the end of arm 131 to limit the movement of arm 41 to obtain the desired cut-out temperature.

To rotate bell crank 130 sufficiently to depress blade 41 to hold the contacts permanently open regardless of the activity of bellows 22, I provide in the present embodiment a slide pin 134 suitably fixed at one end to the arm 132 of lever 130 and slidably guide it in a wall of the housing. The free end of said pin projects into the path of cam 114, and as said cam comes into operative association with the pin upon rotation of the adjustment screw system to "off" position, the rightward displacement of pin 134 (as viewed in Fig. 12) will rotate lever 130 to the desired circuit-opening position.

It will be remembered that actuating blade 41 is essentially a leaf spring; and when it is held in its circuit-opening position pursuant to the operation of cam 114, there is only small opposition to the expansion of bellows 22. For example, it would not be unusual for the thermal system to be exposed to normal room temperature for a prolonged period while the thermostat was being held in the "off" position. Because the bellows would be in a condition of maximum expansion, lever 40 would be at maximum rotation. The flexibility of the actuator blade 41 permits such rotation without overstrain.

The constant cut-in thermostat has a substantial operating advantage in refrigerator applications. The temperature of the refrigerator cabinet rises above 32 degrees F. at each cycle and there is, in effect, a succession of defrost operations, each of small duration but cumulatively sufficient to prevent the build-up of frost. By selecting the cut-out temperature, the average cabinet temperature may be established as desired. The maximum amplitude provides the lowest average cabinet temperature as is apparent from Fig. 14.

While there has been described what are at present considered to be the preferred embodiments of the invention, it will be understood that various modifications may be made therein, and it is intended to cover in the appended claims all such modifications as fall within the true spirit and scope of the invention.

I claim:

1. In a control device, a casing, a lever pivoted therein, said lever having a flexible blade member extending therefrom, an overcenter spring interposed between said casing and the end of said blade member remote from said lever, a fixed contact, a movable contact arranged for cooperation therewith in a circuit to be controlled, means for biasing said movable contact into closed circuit relationship, means on said blade member effective upon movement thereof in a first direction to urge said movable contact into open circuit position and releasing said contact for circuit closing operation thereof upon movement of said blade member in a second direction, a flexible chamber fixed within said casing and having means engaging with said lever to rotate said lever and blade member in one direction upon change in pressure within said chamber, means responsive to an external physical condition to establish the pressure within said chamber, spring means operatively associated with said lever to enforce rotation thereof in the opposite direction upon retraction of said chamber relative to said lever, a stop member movably disposed within said chamber in operative association with said blade member, means for urging said stop member into a preselected position in which said stop member establishes a predetermined extent of disengagement of said blade member from said movable contact following rotation of said blade member in said second direction, and means for optionally displacing said stop member to a position maintaining said blade member in circuit opening position independent of the operaton of said pressure-expansive member.

2. In a control device, a casing, a lever pivoted therein, a flexible blade fixed to said lever at the pivoted end thereof and extending along said lever in spaced relation therewith to a terminus remote from the free end thereof, an overcenter spring interposed between said casing and said blade terminus, a fixed contact, a movable contact arranged for cooperation therewith in an electric circuit to be controlled, means biasing said movable contact into a normal closed circuit relationship with said fixed contact, means on said blade effective upon movement of said blade in one direction to urge said movable contact to open-circuit position, a pressure-expansible chamber fixed within said casing and having a wall engaging with said lever to rotate the same in a direction permitting said contacts to close upon increase in pressure within said chamber, means responsive to an external physical condition to establish the pressure within said chamber, spring means operatively associated with said lever to bias it into engagement with said chamber wall in opposition to the expansion thereof, a stop member disposed within said casing and engageable with said flexible blade member to limit the travel thereof in circuit-opening direction, a stop member disposed within said casing and engageable with said flexible blade member to limit the travel thereof in the opposite direction, and means for optionally displacing said second-named stop member to bear against said blade member to maintain it in open-circuit establishing position independent of the operation of said pressure-expansible chamber.

3. In a control device, a casing, a lever pivoted therein, a flexible member secured to said lever and extending therefrom, an overcenter spring interposed between said casing and the free end of said flexible member, a fixed contact, a movable contact arranged for cooperation therewith in an electric circuit to be controlled, means for biasing said movable contact into circuit-closing relationship with said fixed contact, means on said flexible member effective upon movement of said flexible member in one direction to urge said movable contact into open-circuit position and permitting said contacts to return to closed circuit position upon movement of said lever in the opposite direction, a pressure-expansible chamber fixed within said casing and having a wall engaging with said lever to rotate the same upon increase in pressure within said chamber, means responsive to an external physical condition to establish the pressure within said chamber, spring means operatively associated with said lever to bias the lever into opposite rotation upon retractive movement of said chamber relative to said lever, a stop member disposed within said casing and engageable with said flexible member to limit the travel thereof in the direction permitting closure of said contacts, means for establishing a position of said stop member effecting a predetermined separation of said flexible member from said movable contact following movement of said member in circuit closing direction, means operable externally of said casing to adjust the bias of said spring means relative to said lever, and means effective upon operation of said bias adjustment means to a predetermined position to engage said stop member to drive it against said flexible member to move said flexible member from any previously established position into a position relative to said movable contact maintaining said contact in open circuit position independent of the rotation of said lever by reason of operation of said pressure-expansible chamber.

4. In a control device, a casing, a lever pivoted therein, a flexible blade member secured at one end to said lever and extending thereabove in spaced relation therewith, an overcenter spring interposed between said casing and the free end of said flexible member, a fixed contact, a movable contact arranged for cooperation therewith in an electric circuit to be controlled, means for biasing said movable contact into circuit-closing relationship with said fixed contact, means on said flexible member effective upon movement of said flexible member in a first direction to urge said movable contact into open-circuit position, a pressure-expansible chamber fixed within said casing and having a wall engaging with said lever to rotate the same in a second direction to cause said flexible member to withdraw from said movable contact to permit the same to return to closed circuit position upon increase in pressure within said chamber, means responsive to an external physical condition to establish the pressure within said chamber, spring means within said casing and operatively associated with said lever to bias the lever into engagement with said chamber wall in opposition to the expansion thereof, a stop member disposed within said casing and engageable with said flexible member to limit the travel thereof in circuit-opening direction, a stop member slidably disposed within said chamber to limit the travel of said flexible member in said second direction to establish a desired separation of said flexible member and said movable contact, means for adjustably positioning said second stop member in said limiting position, lever means pivoted within said casing and engaging with said spring means to adjust the bias of said spring means relative to said first-named lever, an adjustment screw mounted within said casing and engaging said second lever to rotate the same, means for rotating said screw, and means effective upon rotation of said screw to a predetermined position to engage with second stop member to drive it against said flexible member for establishing and maintaining the flexible member in position against said first-named stop member independent of the operation of said pressure-expansible chamber.

5. In a control device, a casing, a fixed contact therein, a movable contact arranged for cooperation therewith in an electric circuit to be controlled, means for biasing said movable contact into closed-circuit position, a lever system having blade means operatively associated with said movable contact to effect the operation thereof between closed and open-circuit positions according to the direction of movement of said lever system and associated blade means, a thermosensitive system including expansible means within said casing in operative association with said lever system to effect rotation thereof upon temperature change of an element of said thermosensitive system, means resiliently opposing the movement of said lever system in one direction, means including a rotatable screw for adjusting the opposing effort, a member slidably mounted within said casing in the path of movement of said lever system blade means in circuit-closing direction, means for positioning said member to establish a normal limit of such movement, and cam means operatively associated with said screw and engageable with said member upon rotation of said screw to predetermined position to urge the member against said lever system blade means to rotate the same to circuit-opening position in opposition to said thermosensitive system.

6. In a control device, a casing, a fixed contact therein, a movable contact arranged for cooperation therewith in an electric circuit to be controlled, means for biasing said movable contact into closed-circuit position, a lever system having flexible blade means operatively associated with said movable contact to effect the operation thereof between closed and open-circuit positions according to the direction of movement of said lever system and associated blade means, a thermosensitive system including expansible means within said casing in operative association with said lever system to effect rotation thereof upon temperature change of an element of said thermosensitive system, means resiliently opposing the movement of said lever system in one direction, means including a rotatable screw for adjusting the opposing effort to a predetermined value, a member movably mounted within said casing in the path of movement of said lever system blade means in circuit-closing direction, means for positioning said member to establish a maximum limit of such movement, means for adjustably positioning said member to restrict such movement to less than said maximum limit, and cam means operatively associated with said last-named adjustment means and said member to urge the member downwardly against said blade means to rotate the same to position maintaining said contacts in open circuit relationship in opposition to said thermosensitive system.

7. In a control device, a casing, a fixed contact therein, a movable contact arranged for cooperation therewith in an electric circuit to be controlled, means for biasing said movable contact into closed-circuit position, a lever system including a member operatively associated with said movable contact to operate the same to open circuit position upon movement of said lever system in a first direction and to withdraw therefrom to permit operation thereof to closed circuit position upon movement of said lever system in a second direction, a thermosensitive system including expansible means within said casing in operative association with said lever system to effect rotation thereof in said first or second directions upon temperature change of an element of said thermosensitive system, means resiliently opposing the movement of said lever system in one direction, means including a rotatable screw for adjusting the opposing effort to a predetermined value, a member slidably mounted within said casing in the path of movement of said lever system member in circuit-closing direction, means for positioning said slidable member to establish a maximum limit of such movement, a lever engageable with said slidable member, an adjustment screw associated with said last-named lever to rotate the same in a direction displacing said member to restrict movement of said lever system member to less than said maximum limit, means for rotating said screw, and cam means operated by said screw rotation means and engageable with said slidable member to urge the member against said lever system member to rotate the same to circuit-opening position in opposition to said thermosensitive system.

8. In a control device, a casing, a rigid lever pivoted therein, a flexible blade fixed to said lever at the pivoted end thereof and extending along said lever in spaced relation therewith to a terminus remote from the free end thereof, an overcenter spring interposed between said casing and said blade terminus, a fixed contact, a movable contact arranged for cooperation therewith in an electric circuit to be controlled, means for biasing said movable contact into a normal first circuit relationship with said fixed contact, means on said blade effective upon movement of said blade in one direction to urge said movable contact into a second circuit relationship, and upon movement of said blade in the opposite direction to release said movable contact for return to said first circuit condition, a pressure-expansible chamber fixed within said casing and having a wall movable into engagement with said lever to rotate the same upon change in pressure within said chamber, means responsive to an external physical condition to establish the pressure within said chamber, a stop member disposed within said casing and engageable with said flexible blade member to limit the travel thereof in said one direction, a movable member mounted within said casing and engageable with said flexible blade member to establish a maximum limit of the travel thereof in said opposite direction, a U-spring having an arm member engaging said rigid lever, a screw mounted in said casing and engaging a second arm of said U-spring to establish a fixed bias opposing rotation of said lever by said thermal motor system, and adjustment screw means operatively associated with said movable member to position the same to establish a desired intermediate limit of said blade movement or alternatively to position said movable member to maintain said flexible blade member in a position holding said movable contact in said second circuit condition independent of movement of said lever by said chamber or the bias of said U-spring.

9. In a control device, a casing, a rigid lever pivoted therein, a flexible blade fixed to said lever at the pivoted end thereof and extending along said lever in spaced relation therewith to a terminus remote from the free end thereof, an overcenter spring interposed between said casing and said blade terminus, a fixed contact, a movable contact arranged for cooperation therewith in an electric circuit to be controlled, means for biasing said movable contact into a normal first circuit relationship with said fixed contact, means on said blade effective upon movement of said blade in one direction to urge said movable contact into engagement with said fixed contact and upon movement of said blade in the opposite direction to release said movable contact to return to said first circuit condition, a thermosensitive system including expansible means within said casing in operative association with said rigid lever to effect rotation of said blade member in said one direction upon expansion of said thermosensitive system, spring means interposed between said rigid lever and said casing to bias said lever to oppose such expansion, means for tensioning said spring to establish a desired biasing effort, a lever pivotally mounted within said casing and having an end engageable with said blade to restrict movement thereof in said one direction, and adjustment screw means operatively associated with said last-mentioned lever to displace it relative to said blade to establish a desired amplitude of said movement thereof or optionally to prevent said movement while maintaining said blade in a position holding said movable contact in said opposite circuit relationship.

10. In a control device, a casing, a lever pivoted therein, said lever having a rigid arm extending at substantially right angles from the free end thereof in the plane of rotation of said lever, a flexible blade fixed to said lever at the pivoted end thereof and extending along said lever in spaced relation therewith to a terminus remote from said lever arm, an overcenter spring interposed between said casing and said blade terminus, stop means disposed on one side of said blade to limit the movement thereof in one direction, a second stop means movably disposed within said casing on the other side of said blade to adjustably limit the amplitude of movement of said blade in the opposite direction, a fixed contact, a movable contact arranged for cooperation therewith in an electric circuit to be controlled, said movable contact being spring biased into a pre-established circuit relationship with respect to said fixed contact, a striker on said blade in operative association with said movable contact and effective upon movement of said blade in said one direction to urge said contact into an opposite circuit relationship with respect to said fixed contact, a pressure-expansible chamber fixed within said casing and having a wall movable into engagement with said lever to rotate the same upon increase in pressure within said chamber, means responsive to an external physical condition to establish the pressure within said chamber, a U-spring having arm members respectively engaging said lever arm and supporting means within said casing to bias said lever into engagement with said movable chamber wall in opposition to the expansion of said chamber, said U-spring arm member supporting means comprising a lever pivotally mounted in said casing, the free end of said lever having a knife-edge portion engaging with said spring arm member, and means for adjusting said supporting means relative to said first-named lever arm member to establish a desired bias in said U-spring.

11. A control device according to claim 10, in which a line through the points of engagement of said spring arm members with the respective levers is substantially a continuation of the arm portion of said first-named lever.

12. In a control device, a casing, a lever pivotally mounted therein, a thermoresponsive system having an expansible chamber disposed within said casing in operative association with said lever to rotate said lever upon expansion of said chamber in response to temperature rise within the thermoresponsive system, means actuated by the rotation of said lever to control an electrical circuit, means acting on said lever to resiliently maintain it in engagement with said chamber in opposition to the expansion thereof, a rigid base plate for said expansible chamber, resilient tongues on a wall of said casing engageable with said base plate to secure said chamber relative to said lever, and a rigid saddle member fixed to said base plate and extending across said chamber intermediate said chamber and said lever to limit the expansion of said chamber, said casing wall having an opening through which said expansible chamber and the base plate may be inserted into said casing prior to securement of said base plate by said resilient tongs.

References Cited in the file of this patent

UNITED STATES PATENTS

| Number | Name | Date |
|---|---|---|
| 1,759,537 | Buckbee et al. | May 20, 1930 |
| 2,092,085 | Riley | Sept. 7, 1937 |
| 2,111,856 | Henning | Mar. 22, 1938 |
| 2,150,203 | Bondurant | Mar. 14, 1939 |
| 2,184,339 | Ettinger | Dec. 26, 1939 |
| 2,314,211 | Hausler | Mar. 16, 1943 |
| 2,403,824 | Newell | July 9, 1946 |
| 2,620,414 | Thorsheim | Dec. 2, 1952 |